United States Patent [19]

Trigg

[11] Patent Number: 4,987,104
[45] Date of Patent: Jan. 22, 1991

[54] METHOD OF FORMING A CERAMIC PRODUCT

[75] Inventor: Mark B. Trigg, Mulgrave, Australia

[73] Assignee: Commonwealth Scientific & Industrial Research Organization, Campbell, Australia

[21] Appl. No.: 272,804

[22] PCT Filed: Mar. 13, 1987

[86] PCT No.: PCT/AU87/00072
§ 371 Date: Nov. 1, 1988
§ 102(e) Date: Nov. 1, 1988

[87] PCT Pub. No.: WO87/05597
PCT Pub. Date: Sep. 24, 1987

[30] Foreign Application Priority Data

Mar. 14, 1986 [AU] Australia .................. PH5042/86

[51] Int. Cl.$^5$ .................. C04B 35/56; C04B 35/58
[52] U.S. Cl. .................. 501/92; 501/95; 501/97; 501/98
[58] Field of Search .................. 501/92, 97, 95, 98; 106/65

[56] References Cited

U.S. PATENT DOCUMENTS

| 3,305,372 | 2/1967 | Taylor | 106/55 |
|---|---|---|---|
| 3,960,581 | 6/1976 | Cutler | 501/98 |
| 4,499,193 | 2/1985 | Phelps et al. | 501/98 |
| 4,506,021 | 3/1985 | Jack et al. | 501/98 |
| 4,511,666 | 4/1985 | Phelps et al. | 501/98 |
| 4,800,182 | 1/1989 | Teaki et al. | 501/92 |
| 4,818,635 | 4/1989 | Ekstrom et al. | 428/698 |
| 4,826,791 | 5/1989 | Mehrotra et al. | 501/89 |

FOREIGN PATENT DOCUMENTS 60-047087 1/1985 Japan .................. 501/92

Primary Examiner—William R. Dixon, Jr.
Assistant Examiner—Chris Gallo
Attorney, Agent, or Firm—Sughrue, Mion, Zinn, Macpeak & Seas

[57] ABSTRACT

A method of forming a dense ceramic product comprised of silicon nitride and silicon oxynitride or aluminum substituted derivative of either in which silica is subjected to a controlled partial carbothermal reduction process in the presence of nitrogen to produce residual silica and silicon nitride, fabricating the resulting material into the desired shape and heating in a nitrogen atmopshere at a temperature of from 1400° C. to 2000° C. with or without pressure to form the product. The silica may conveniently be derived from pyrolysed rice hulls. The product may also comprise silicon carbide, which may be derived from the carbothermal reduction, and a glassy phase. pyrolysed rice hulls. The product may also comprise silicon carbide, which may be derived from the carbothermal reduction, and a glassy phase.

10 Claims, No Drawings

METHOD OF FORMING A CERAMIC PRODUCT

TECHNICAL FIELD

The present invention relates to ceramic products and is particularly concerned with a method of forming a ceramic product by converting silica to silicon nitride in a carbothermal reduction process in the presence of nitrogen, fabricating the silicon nitride into the desired shape of the ceramic product and sintering the fabricated silicon nitride.

BACKGROUND OF THE INVENTION

It is widely accepted that silicon nitride has excellent intrinsic properties such as strength, hardness, oxidation, creep and thermal shock resistance. However, because of the highly covalent nature of the chemical bonding in this material and corresponding low diffusion rates, traditional ceramic fabrication techniques do not lead to dense bodies. In order to achieve low porosity materials, densification aids are necessary which compromise the properties of fabricated specimens especially at elevated temperatures.

A development was the discovery that aluminium could be incorporated into the lattice structure of silicon nitride. The material so formed was believed to be a single phase solid solution of alumina in silicon nitride. Early workers found this material was easily fabricated using well known ceramic techniques However, it was subsequently reported that this material is multi-phased and that the original formula was incorrect. Thus, the solid solution was not as previously proposed but existed between silicon nitride and aluminium oxynitride $Al_3ON_3$. The properties of the early materials were inferior to those of silicon nitride as a result of a residual grain boundary glass which also explained the greater ease of densification. The correct formula for aluminium substituted silicon nitride (designated $\beta$-sialon) is $$Si_{6-z} Al_z O_z N_{8-z} \text{ where } z \leq 4.2 \text{ at } 1750^\circ \text{ C.}$$

In order to sinter these materials to high density, sintering aids are necessary.

Another non-oxide ceramic with excellent intrinsic properties is silicon oxynitride. This material has been used as a bonding phase for silicon carbide refractories, and it has been reported that limited replacement of silicon and nitrogen by aluminium and oxygen can also occur in silicon oxynitride (O-sialon).

It has long been appreciated that rice hulls can be utilized as a raw material in the manufacture if silicon nitride and silicon carbide powders both in whisker and particulate forms. At present rice hulls pose a considerable waste disposal problem. With Australian rice production levels as high as 830 000 tonnes (1982), up to 160 000 tonnes of rice hulls are being produced annually. In the Australian context, if all the rice hull waste produced by the milling of rice was used to make silicon nitride, up to 20 000 tonnes could be produced per annum based on recent figures for the production of rice.

Rice hulls contain approximately 20 weight percent silica with the bulk being organic material. Pyrolysis of the rice hulls leads to a 60 percent weight loss. The resultant material consists of approximately 55 weight percent silica and 45 weight percent of carbon Both are in a finely divided state and intimately mixed. Upon ashing, a material containing in excess of 95 weight percent silica can be obtained Elements such as iron, aluminium, sodium, potassium, calcium and magnesium may also be present.

The formation of silicon nitride and silicon carbide from rice hulls involves a number of steps. The rice hulls are pyrolysed to decompose the organic component to carbon. This material is then heated at temperatures between 1000° to 2000° C. to form the silicon carbide or nitride. Early work on the formation of silicon carbide and nitride from rice hulls is the subject of United States parent specifications Nos. 3754076 and 3855395.

A problem with the conventional method for the manufacture of dense ceramic materials from the products of the carbothermal reduction of silica is that, after the process, unreacted silica can be present and must be separated from the product. This usually involves a leaching process. Additions of catalyst can be made to increase the reaction rate, and a common additive is iron. However, the presence of such additives has been shown to be detrimental, leading to impaired mechanical properties and decreased oxidation resistance as well as promoting the decomposition of silicon nitride during sintering.

The production of materials based on $\beta$-sialons, utilizing the reaction products of a carbothermal reduction has been proposed in U.S. patent specification No. 3960581. The proposed reactants for the fabrication of these ceramic components were 15 to 70 weight percent alumina and 85 to 30 weight percent silicon nitride. However, it is believed that this reaction produces ceramic materials with properties inferior to those of silicon nitride and corresponding $\beta$-sialons.

It is an object of the present invention to produce a ceramic product which may be readily densified and which has desirable intrinsic properties and there is accordingly provided a method of forming a ceramic product by converting silica to silicon nitride in a carbothermal reduction process in the presence of nitrogen, fabricating the silicon nitride into the desired shape of the ceramic product and sintering the fabricated silicon nitride, characterised in that the carbothermal reduction process is not completed so as to produce a mixture comprising residual silica and silicon nitride which is fabricated into the desired shape and is heated in a nitrogen atmosphere at a temperature of from 1400° C. to 2000° C. to produce a ceramic product comprised of silicon nitride and silicon oxynitride A low or controlled oxygen partial pressure may be present in the heating atmosphere. The oxygen may be derived from the reaction or entrained in the heating atmosphere.

Further according to the present invention there is provided a ceramic product when formed by the method s described in the immediately preceding paragraph. The product may comprise from 1-99 weight percent silicon oxynitride and from 1 to 95 weight percent silicon nitride. Generally there will also be a gassy phase present in the ceramic material, but this may have a thickness of only a few nanometers at the grain boundaries and represent as little as 0.01 weight percent of the ceramic material. The glassy phase at this level may be composed of impurities in the initial materials, such as calcium, magnesium and aluminium and may also contain silicon, oxygen and nitrogen so that it can be present as silicates and oxynitrides.

We have found that the fabricated mixtures can be readily densified and provide advantageous intrinsic properties for use in fields similar to silicon nitride and silicon oxynitride.

Sintering aids can be used to assist densification and these can be added as the metal, oxide, nitrate, carbonate or nitride of the following elements: lithium, beryllium, magnesium, calcium, scandium, yttrium, cerium, titanium, zirconium, hafnium and members of the rare earth group. Sintering can be performed with or without external pressure. The sintering aids tend to go into the glassy phase which may comprise up to about 20 weight percent of the ceramic product.

The ceramic product may also contain up to 40 weight percent silicon carbide, particularly where this is a reaction product of the incomplete carbothermal reduction process. Silicon carbide is formed in the carbothermal reduction process if there is an insufficient nitrogen partial pressure to convert the silica only to silicon nitride, or if the process is carried out in a temperature range of, for example, from 1500° to 1600° C.

At least part of the silicon oxynitride and silicon nitride in the ceramic product may be present in the form of one or more aluminium substituted derivatives such as β-sialon and O-sialon. Thus the main crystalline phases may obey the general formulae:

$Si_{2-x} Al_x O_{1+x} N_{2-x}$ where $x \leq 0.2$ and $Si_{6-z} Al_z O_z N_{8-z}$ where $z \leq 1$.

Thus, in addition to the silica and silicon nitride used in the method of the present invention, the fabricated mixture may conveniently comprise one or more of the following finely divided particulate materials: silicon carbide, silicon, alumina, aluminium nitride, aluminium hydroxide and aluminium silicates. Preferably the fabricated mixture comprises 0.3 to 36 weight percent silica, 0.5 to 15 weight percent alumina, up to 15 weight percent aluminium nitride, up to 40 weight percent silicon carbide and from 34 to 97 weight percent silicon nitride. Most preferably, the silica content is from 5 to 30 weight percent, the alumina content is from 3 to 10 weight percent and the silicon nitride content is from 60 to 90 weight percent.

The ceramic product may further comprise whisker or fibre reinforcement and this is conveniently based on the elements silicon, aluminium, oxygen, nitrogen and carbon.

A very substantial advantage of the present invention is that all or some of the finely divided particulate materials in the fabricated mixture may be derived from the incomplete carbothermal reduction of silica. The silica may be derived from clays (also generally containing alumina) and other well known sources, but most conveniently is derived from the product of the pyrolysis of rice hulls which generally contains about 0.25 weight percent aluminium in oxide form. Where the precursor powders are derived from treated rice hulls the rice hulls may be pyrolysed at from 250° to 1000° C. to decompose the organic components and then heated in a nitrogen atmosphere at between 1000° to 2000° C. for a sufficiently short period that not all of the silica present undergoes carbothermal reduction, and subsequently given a low temperature heat treatment to remove residual carbon and to yield a mixture of silica and silicon nitride with or without silicon carbide. The purity of the pyrolysis product can be increased by the use of relatively simple treatments such as water or acid extractions. Investigations have shown that water and acid extractions performed on rice hulls have yielded silica with greater than 99 and 99.5 percent purity respectively. This step is most effectively carried out on the rice hulls before the pyrolysis operation.

The low temperature heat treatment may be performed at a temperature of 500° C. to 1000° C., for example at 700° C., in an oxygen containing atmosphere to remove the excess carbon.

It may be advantageous to include one or more other gases, such as hydrogen, in the nitrogen carbothermal reduction atmosphere. Preferably the carbothermal reduction is performed over a time period of from 6 hours to 30 hours in a preferred temperature range of 1300° C. to 1450° C.

The complete carbothermal reduction of silica is as follows:

$$SiO_2 + 2C \xrightarrow{N_2} \tfrac{1}{3}Si_3N_4 + 2CO$$

However the incomplete carbothermal reduction step will produce as end products both silica and silicon nitride as well as possibly silicon carbide. Alumina can be added into the carbothermal reduction step, or thereafter if none or insufficient is already present. The main precursor powders formed by the controlled reaction of silica and carbon can be produced with crystalline morphologies with either high or low aspect ratios or a combination of both types. Particle size of the powders, which will usually be equiaxed, is preferably less than 5 μm and most preferably less than 0.5 μm. When whiskers formed in the carbothermal reduction of silica are used in the fabricated mixture they preferably have diameters less than 2 μm, most preferably less than 1 μm while advantageously being greater than 5 μm long and preferably longer than 10 μm. Any aluminium containing species present preferably has a particle size of less than 10 μm. The powder may be milled to break up any agglomerates and the aluminium species may be added at this stage.

The fabrication and densification step may be as follows:

$$a(2-x)SiO_2 + [a(2-x) + b(6-z)] Si_3N_4 +$$

$$2(xa + zb) Al_2O_3 + zb \, AlN \longrightarrow$$

$$4a \, Si_{2-x}Al_xO_{1+x}N_{2-x} + 3b \, Si_{6-z}Al_zO_zN_{8-z}$$

where approximately $0.01 \, a \leq 25$ $0.1 \, b \leq 33$ $4a + 3b = 100$ $x \leq 0.2$ $z \leq 1$ The overall composition of the fired materials, except for any silicon carbide present, may accordingly be bounded approximately by the following compositions:
(1) $Si_2N_2O$
(2) $Si_{1.8} Al_{0.2} O_{1.2} N_{1.8}$,
(3) $Si_5 Al_1 O_1 N_7$ and
(4) $Si_3 N_4$.

The ceramic product preferably has a fine grained microstructure with grains less than 5μ in size, with or without high aspect ratio grains with aspect ratios greater than 5.

EXAMPLES

Various examples of a process in accordance with the present invention will now be described in a non-limiting manner.

EXAMPLE 1

A quantity of rice hulls was washed with distilled water to remove foreign material, such as clay and dirt, and dried at 105° C. A liquid extraction was carried out in distilled water under reflux conditions for a period of 2 hours. The ratio by weight of washed rice hulls to water 1:50. The resulting material was dried at 105° C. The organic components were decomposed by heating at 275° C. for 20 hours in air. The weight loss after this operation was 55%. The sample was then ground in a silica mortar and pestle and was subsequently heated in a nitrogen atmosphere for 15 hours at a temperature of 1400° C. in an alumina boat in a tube furnace. The linear velocity of the gas entering the furnace was 0.4 m per minute. The weight loss after this stage was 51%. The powder was then heated at 700° C. in air for 2.5 hours to remove any traces of carbon. Chemical analyses of the rice hulls before and after the carbothermal reduction, with different treatments, are shown in table 1. This shows that water extraction is successful in reducing the alkali metal concentration. The acid extractions were carried out in a boiling 5% hydrochloric acid solution for a two hours under reflux conditions. This treatment reduced the concentrations of the alkali and alkaline earth metals.

TABLE 1

CHEMICAL ANALYSIS OF RICE HULLS BEFORE AND AFTER CARBOTHERMAL REDUCTION (WEIGHT PERCENT)

| Treatment | Before (Ash only) | | | | After | | | |
|---|---|---|---|---|---|---|---|---|
| | 1 | 2 | 3 | 4 | 1 | 2 | 3 | 4 |
| Iron | 0.05 | 0.04 | 0.06 | 0.01 | 0.04 | 0.03 | 0.05 | 0.02 |
| Aluminium | 0.09 | 0.06 | 0.08 | 0.04 | 0.8 | 0.6 | 0.2 | 0.4 |
| Sodium | 0.03 | 0.02 | 0.01 | 0.01 | 0.01 | 0.01 | 0.01 | 0.02 |
| Potassium | 1.5 | 1.1 | 0.2 | 0.01 | 0.02 | 0.02 | 0.01 | 0.03 |
| Magnesium | 0.2 | 0.2 | 0.2 | 0.01 | 0.1 | 0.1 | 0.1 | 0.02 |

Treatments: 1 As Received; 2 Water Washed; 3 Water Extraction; 4 Acid extraction The resulting powder was then milled for 2 hours in an alumina mull using alumina grinding media and isopropanol as the milling fluid. The alumina pickup from this operation was five percent (i.e. at the rate of 5 g of alumina per 95 g of starting powder). The milling media were separated from the slurry and the latter was then dried and uniaxially pressed in a hardened steel die assembly to form a compact which was cold isostatically pressed (CIP) at a pressure of 210 MPa.

The sample was then hot pressed at a temperature of 1800° C. for 40 minutes and a pressure of 35 MPa in a graphite die assembly, lined with boro nitride to suppress reaction between the graphite and sample at high temperatures. The bulk density of the sample was 2.76 g/cc. The phases detected by X-ray diffraction (XRD) techniques after the high temperature reaction were silicon oxynitride together with a minor amount (approximately 5 wt %) of silicon nitride. The resulting microstructure was fine grained and consisted of equiaxed grains, approximately 0.5 microns in size and high aspect ratio grains (aspect ratio greater than 5). Analysis of the microstructure by transmission electron microscopy (TEM) techniques revealed that at the grain boundaries, the intergranular glass phase was typically less than 10 nanometers thick. Isolated regions of glass phase, approximately 0.2 microns in extent, were also located at some triple points. The Vickers hardness of this material, as determined with a ten kilogram load, was 15.0 GPa.

EXAMPLE 2

Rice hulls were washed and extracted as described in example 1. The dried hulls were shredded in a commercial blender to reduce their bulk. The hulls were then pyrolysed at 700° C. for 1.5 hours in a flowing nitrogen atmosphere. The weight loss for this operation was 57 percent. An agate mortar and pestle was used to crush the hulls. Portions of this material were loaded graphite crucibles and heated in an alumina tube furnace. The atmosphere was nitrogen which was admitted to the tube with a linear velocity of 0.2 m per minute. Samples were held at a maximum temperature of 1400° C. for 24 hours. The weight loss after the carbothermal reduction reaction was 44 percent. The resulting powder was heated to 700° C. for 11 hours to remove any residual carbon. The weight loss was 35 percent. The powder was then milled as described in example 1 for 8 hours. There was a six percent by weight pickup of alumina from this operation (i.e. at the rate of 6 g of alumina for 94 g of starting powder). A portion of the dried powder was uniaxially pressed in hardened steel dies and plunger set and then CIP at 210 MPa. This sample was hot pressed as outlined in example 1. The final bulk density of the sample was 3.06 g/cc. The phases detected by XRD techniques were silicon nitride and silicon oxynitride. The Vickers hardness of this specimen, as determined with a ten kilogram load, was 19.4 GPa.

EXAMPLE 3

Rice hulls were washed to remove any foreign matter and then were heated under reflux conditions for two hours in distilled water. The mass ratio of rice hulls to water was 1:15. The hulls were then dried and heated in nitrogen atmosphere and held for two and a half hours at a temperature of 700° C. The resulting material consisted essentially of a mix of silica and carbon. Analysis of this product revealed a carbon content of 47 weight percent. The weight loss after the pyrolysis operation was 56 percent.

The pyrolysis products were then heated in graphite crucibles in a tube furnace to a temperature of 1450° C. for selected times to obtain controlled ratios of silica to silicon nitride. This temperature was considered the most appropriate as it allowed the reaction to proceed at a reasonable rate without the formation of unwanted amounts of silicon carbide, the creation of which is favoured at elevated temperatures. The atmosphere of nitrogen gas was admitted into the chamber with a linear velocity of 0.2 m per minute. The weight losses recorded for this step were between 25 and 45 percent, with the higher weight losses being obtained for the longer dwell times. The resulting powder consisted of a mixture of silicon nitride, silica and carbon.

The powder was then heated to a temperature of 700° C. for ten hours to remove any remaining carbon (which was originally present in excess of that required for the reaction). The weight loss for this step depended on the carbothermal reduction reaction time and varied between approximately 35 and 40 weight percent, with the higher weight losses being recorded for the shorter reaction times. The yield of silicon nitride for selected times is shown in table 2. The amount of silicon nitride produced will depend on a number of factors, such as the type and level of impurities, reactivity of the reactants, rate at which gaseous reaction products leave the reaction zone, reaction temperature and time. It is expected that the yield of silicon nitride, at specified times, will vary for different carbothermal reduction units.

The yields of silicon nitride were determined by a quantitative analysis using XRD techniques with an internal standard. The accuracy was estimated to be plus or minus 5 percent.

TABLE 2

THE YIELDS OF SILICON NITRIDE AT A TEMPERATURE 1450° C. FOR SELECTED TIMES (ERROR ± 5%)

| TIME (H) | YIELD (%) |
|---|---|
| 5 | 45 |
| 6 | 80 |
| 7 | 95 |
| 10 | >95 |
| 20 | >95 |

EXAMPLE 4

Powder was prepared as described in example 3 with a yield of silicon nitride of 80 percent as determined by the quantitative analysis. To this powder alumina, known as XA17 from Alcoa USA, was added in controlled amounts. The levels of addition and selected physical properties are shown in table 3.

The powder was then mixed in an alumina mortar and pestle for 30 minutes. The powder was compacted into discs by uniaxial pressing in a hardened steel die assembly, then isostatically pressed at 210 MPa and then loaded into a boron nitride lined graphite die and plunger assembly. The maximum pressure applied to the specimen was 35 MPa. The phases detected after hot pressing were silicon nitride and silicon oxynitride together with silicon carbide in the approximate weight ratio of 3:3:1 respectively. The weight losses were typically 7 percent with lower losses being recorded with the higher levels of alumina addition. The fired bulk densities are intermediate between that of silicon oxynitride at 2.8 g/cc (JCPDS Diffraction Data 33-1162) and silicon nitride at 3.2 g/cc (JCPDS Diffraction Data 33-1160), reflecting the multi-phase nature of these materials.

The modulus of rupture (MOR) were determined in 3 point configuration. The MOR values obtained are comparatively modest as a consequence of the powder processing techniques employed. It is well known that the presence of defects and flaws have adverse effects on the strength of ceramic materials. It is anticipated that improved methods would result in higher values of MOR.

The hardness of the fabricated products were evaluated by the Vickers hardness technique using a load of 10 kg. A trend of increasing values of hardness with decreasing aluminium content was observed. The fracture toughness values were obtained by the indentation technique. The values obtained are typical for ceramic materials. It is expected that the fracture toughness would increase with higher levels of secondary glass phase as in the case of liquid phase sintered silicon nitride based ceramics, however, this can exert a deleterious effect on the high temperature properties of such materials.

TABLE 3

SUMMARY OF HOT PRESSING

| Specimen | Alumina Concentration (wt %) | Fired Density (g/cc) | MOR MPa | Vickers Hardness (Gpa.) | Fracture Toughness (MPa · m$^{0.5}$) |
|---|---|---|---|---|---|
| A | 1% | 2.87 | 360 | 19.4 | 3.5 |
| B | 5% | 2.91 | 300 | 19.1 | 3.4 |
| C | 9% | 2.98 | 310 | 17.2 | 3.6 |

NOTES:
Hot pressing conditions: (1) 1600° C. for 15 minutes and 1800° C. for 30 minutes; (2) 1600° C. for 15 minutes and 1800° C. for 40 minutes

EXAMPLE 5

The powder was prepared as described in example 3, with a silicon nitride content of 90 percent. Hot pressed specimens were prepared as described in Example 4 and the results are summarized in table 4. Analysis by XRD of specimens after hot pressing, revealed silicon nitride and silicon oxynitride together with silicon carbide in the approximate weight ratio of 3:1:0.7 respectively. The addition of alumina greatly facilitated the densification of powders with a higher silicon nitride content. Improved powder processing, as discussed in example 4, may result in greater densification rates for compositions with lower levels of alumina addition. However, powders with higher levels of silica in the starting mix are easier to densify as a result of the higher level of transient liquid available for densification at fabrication temperatures. The lower level of densification is reflected in the hardness value obtained for specimen D. Further support, for improved powder processing techniques resulting in higher MOR values, is that even with a relatively high level of porosity, the MOR values obtained for specimen D, were comparable to those obtained for other materials.

TABLE 4

SUMMARY OF HOT PRESSING

| Specimen | Alumina Concentration (wt %) | Fired Density (g/cc) | MOR MPa | Vickers Hardness (GPa) | Fracture Toughness (MPa · m$^{0.5}$) |
|---|---|---|---|---|---|
| D$_1$ | 1% | 2.51 | 300 | 11.7 | — |
| E$_3$ | 5% | 2.98 | 400 | 18.8 | 3.4 |

NOTES:
Hot pressing conditions: (1) 1600° C. for 15 minutes and 1800° C. for 30 minutes; (3) 1600° C. for 15 minutes and 1800° C. for 60 minutes Many modifications and variations of this invention may occur to those skilled in the art on reading this description or otherwise being informed of the invention and all such modifications and variations are to be considered as falling within the scope of the invention.

I claim:

1. A method of forming a ceramic product by converting silica to silicon nitride in a carbothermal reduction process in the presence of nitrogen, fabricating the silicon nitride into the desired shape of the ceramic product and sintering the fabricated silicon nitride, characterised in that the carbothermal reduction process is partially completed so as to produce a mixture comprising residual silica and silicon nitride which is fabricated into the desired shape and is heated in a densification step in a nitrogen atmosphere at a temperature of from 1400° C. to 2000° C. to produce a ceramic product comprised of silicon nitride and silicon oxynitride.

2. A method according to claim 1 wherein the carbothermal reduction process also produces silicon carbide and up to about 40% silicon carbide is present in the ceramic product.

3. A method according to claim 1 wherein following the carbothermal reduction process the particulate material is heated to remove residual carbon.

4. A method according to claim 1 wherein at least part of the silicon nitride and/or silicon oxynitride is present in the form of one or more aluminium substituted derivatives.

5. A method according to claim 4 wherein aluminium is added before or after the carbothermal reduction process.

6. A method according to claim 4 wherein aluminium is present in the silica source material.

7. A method according to claim 6 wherein the silica source material comprises rice hulls which are pyrolysed prior to the carbothermal reduction process.

8. A method according to claim 1 wherein the densification step is performed in the presence of a sintering aid selected from the metal, oxide, nitrate, carbonate or nitride form of one or more of the following group of elements: lithium, beryllium, magnesium, calcium, scandium, yttrium, cerium, titanium, zirconium, hafnium and members of the rare earth group.

9. A method according to claim 1 wherein the densification step is performed using external pressure.

10. A method according to claim 1 wherein whiskers are formed during the carbothermal reduction.

* * * * *